United States Patent
Isele et al.

(10) Patent No.: US 12,265,902 B2
(45) Date of Patent: Apr. 1, 2025

(54) METHOD AND SYSTEM FOR AUTOMATICALLY LABELING RADAR DATA

(71) Applicant: Dr. Ing. h.c. F. Porsche Aktiengesellschaft, Stuttgart (DE)

(72) Inventors: Simon Tobias Isele, Stuttgart (DE); Marcel Peter Schilling, Karlsruhe (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 917 days.

(21) Appl. No.: 17/386,598

(22) Filed: Jul. 28, 2021

(65) Prior Publication Data

US 2022/0083841 A1 Mar. 17, 2022

(30) Foreign Application Priority Data

Sep. 15, 2020 (DE) ...................... 10 2020 123 920.3

(51) Int. Cl.
*G06T 7/11* (2017.01)
*G01S 17/86* (2020.01)
(Continued)

(52) U.S. Cl.
CPC .............. *G06N 3/045* (2023.01); *G01S 17/86* (2020.01); *G06N 3/047* (2023.01); *G06V 20/70* (2022.01)

(58) Field of Classification Search
CPC ........ B60W 50/16; B64D 45/00; G01S 17/86; G06K 9/6261; G06T 7/521; G06T 5/20;
(Continued)

(56) References Cited

U.S. PATENT DOCUMENTS 10,163,017 B2  12/2018  Minster
10,317,522 B2  6/2019  Tong et al.
(Continued)

FOREIGN PATENT DOCUMENTS

DE  10 2017 203 344  9/2017
DE  10 2017 210 156  12/2018
(Continued)

OTHER PUBLICATIONS

German Search Report of Apr. 16, 2021.

*Primary Examiner* — Phuoc H Doan
(74) *Attorney, Agent, or Firm* — Gerald E. Hespos; Michael J Porco

(57) ABSTRACT

A method for labeling vehicle-generated sensor data uses radar points from a radar detector, image data from camera(s) and lidar data from a lidar with overlapping fields-of-view. The method assigns plausibility labels to the radar points from the image data corrected by image-rectification, generates a camera-based depth estimation from a neural network calibrated by the lidar data, calculating a three-dimensional point from two-dimensional image information by the camera-based depth estimation, with the cloud being associated with the radar points and the lidar data being associated with the radar points. A radar/lidar plausibility and a radar/camera plausibility arise and are merged to form an optics-based plausibility. A radar/tracking plausibility is assigned to each radar point by tracking. The method then includes combining the optics-based plausibility and the radar/tracking plausibility and assigning a plausibility label to indicate whether the radar detection describes an artifact or a plausible reflection.

8 Claims, 2 Drawing Sheets

(51) Int. Cl.
   *G06N 3/045* (2023.01)
   *G06N 3/047* (2023.01)
   *G06V 20/70* (2022.01)

(58) Field of Classification Search
   CPC ..... G06V 10/945; G06F 16/735; H04L 67/12; H04W 4/48
   See application file for complete search history.

(56) References Cited

U.S. PATENT DOCUMENTS

| | | | | |
|---|---|---|---|---|
| 2019/0004535 | A1* | 1/2019 | Huang | H04N 13/254 |
| 2021/0146939 | A1* | 5/2021 | Sari | G01S 13/931 |

FOREIGN PATENT DOCUMENTS

| | | |
|---|---|---|
| DE | 10 2018 121 122 | 3/2019 |
| EP | 3 293 669 | 3/2018 |
| WO | 2019/161300 | 8/2019 |

* cited by examiner

METHOD AND SYSTEM FOR AUTOMATICALLY LABELING RADAR DATA

CROSS REFERENCE TO RELATED APPLICATION

This application claims priority under 35 USC 119 to German Patent Appl. No. 10 2020 123 920.3 filed on Sep. 15, 2020, the entire disclosure of which is incorporated herein by reference.

BACKGROUND

Field of the Invention

The invention relates to a method for automatically labeling radar data or radar points obtained from a radar detection in a vehicle that has automated driving properties or that can be used as a data collector for the development of automated driving properties. Further, a system is proposed on which the method is carried out.

Related Art

Labeling or an annotation is a designation of data or of dynamic and static objects and surround features represented by data. Within the scope of machine learning, such as supervised learning, labeling forms a necessary step for analyzing raw data available from a radar. Conceivable annotations for radar signals are plausibility values that can be ascribed to a detection to differentiate the detection from artifacts. Radar artifacts can be understood to mean effects such as measurement noise, multiple reflections, and erroneous detections. By contrast, points with a high plausibility represent reliable radar reflections of the surroundings, such as: vehicles; constructed structures, such as walls and posts; as well as other restrictions relevant in the context of traffic. As point cloud data (with, e.g., several hundred points per measurement cycle that can be in the two-digit millisecond range), radar data at a detection level can only be manually labeled with much outlay, in a very time-consuming fashion, and at great expense. In so doing, manual procedures offer significant margins for errors or inconsistencies. Moreover, there is no automated labeling process that can carry out this task.

DE 10 2017 203 344 A1 describes the capture of elongate objects relative to a host vehicle, in which the objects are captured by a multiplicity of object capture apparatuses, and patterns corresponding to elongate objects in the captured data are identified. The captured data are assembled from data integrated from at least two of the multiplicity of object capture apparatuses.

EP 3 293 669 A1 discloses an object recognition system having a camera that provides an output with information in respect of possible objects. On the basis of information from at least one further detector that is not a camera provides information, and, based on information from the non-camera detector, a processor chooses an excerpt from the camera output that could contain a possible object and determines object characteristics of this excerpt.

WO 2019/161300 A1 presents a method in which sensor data from a field of view of at least one sensor is supplied to a first neural network and from which object data are assigned to respective locations with detected objects. Properties of clusters of detected objects are supplied to a second neural network, and, based on the respective locations, a confidence value is obtained. The confidence value reflects the probability that the cluster corresponds to an object in the surroundings.

Against this backdrop, it is an object of the invention to present an automated, detection level method for labeling radar points obtained directly from a radar detection. Further, a system on which this method can be carried out is provided.

SUMMARY

A method is provided for automatically labeling sensor data of an observed scene. The method may be carried out using a vehicle that has a radar detection, at least one camera and one lidar as optical sensors. The observed scene is a vehicle surrounding, and the radar detection, the camera and the lidar may have at least a portion of the surroundings of the vehicle as a respective field of view. The respective fields of view at least partly overlap in a coverage region. In a succession of time steps, a set of intrinsically three-dimensional radar points is provided as radar detection, a set of intrinsically two-dimensional image data is provided by the at least one camera, and a set of intrinsically three-dimensional lidar data is provided by the lidar at each time step t. A plausibility label is assigned automatically to a respective radar point at each time step by virtue of:
- the image data being corrected for a straight ahead view of the scene by image rectification and a subsequent perspective transformation,
- a camera-based depth estimation generated by a neural network being calibrated by means of the lidar data in a coverage region of the fields of view of camera and lidar,
- a three-dimensional point cloud representation being calculated from two-dimensional image information by means of the camera-based depth estimation (which also takes account of intrinsic camera parameters—such as a focal length),
- the three-dimensional point cloud representation being associated with the radar points and the lidar data being associated with the radar points by way of an application of a k-closest neighbor algorithm, as a result of which, depending on the coverage region of the fields of view, a radar/lidar plausibility and a radar/camera plausibility arise taking account of Euclidean distances and uncertainties,
- the radar/lidar plausibility and the radar/camera plausibility being merged taking account of the respective field of view to form a combined optics-based plausibility,
- in parallel therewith, a radar/tracking plausibility being assigned to each radar point by means of tracking, with odometry data of the vehicle being taken into account,
- the optics-based plausibility and the radar/tracking plausibility being combined and a binary plausibility label subsequently being assigned, the latter characterizing whether the respective radar detection describes an artifact or a plausible reflection.

A conversion into the three-dimensional point cloud representation can be implemented by way of the depth estimation, which is naturally not present in a two-dimensional image. This conversion also corresponds to a projection.

The k-nearest neighbor (k-NN) algorithm spans a circle in two dimensions or a sphere in three dimensions around a first point for which the k nearest neighbors should be ascertained. The radius of the circle or sphere is increased until a number of k neighboring points are situated within the radius. By way of a respective k-nearest neighbor search with the pixel-by-pixel traverse of the image data or the three-dimensional point cloud representation, and the lidar data, it is possible to associate the respective point selections with the radar detections.

Radar signal levels ordered in increasing sequence are: 1. raw data in the frequency spectrum; 2. detection data in the form of 3D points; and 3. tracked-clustered object lists. The method of one embodiment includes carrying out labeling with respect of the plausibility of radar points still on the detection level, i.e., directly after ascertaining/assembling the radar points from the raw data in the frequency spectrum and still before the transfer of the data to a superordinate application. Therefore, a superordinate application already is provided with respectively assigned plausibility values as binary plausibility labels, for example with the values of 0 (artifact) or 1 (plausible reflection), together with the three-dimensional radar points. By way of example, this superordinate application can be a function of autonomous driving or an autopilot. Consequently, the method provides an automated pipeline for calculating most obvious or most probable associations of radar information from respective optical sensors, in this case from the so-called on-board sensor system with radar, lidar and the at least one camera. The method of the invention can also be referred to as a "radar artifact labeling framework", abbreviated RALF.

In one embodiment of this disclosure, an angular velocity of a yaw angle and a translation velocity from the odometry data of the vehicle are used for tracking points of the radar/tracking plausibility of radar points over time. This radar/tracking plausibility is integrated with the combined optics-based plausibility. The odometry represents a further on-board sensor system which provides its data via a CAN bus.

In a further embodiment, the radar detection is formed by plural radar sensors. In general, radar sensors can be arranged at corners and on sides of the vehicle. Likewise, cameras can be arranged centrally on all sides of the vehicle.

A further embodiment includes checking consistency of plausibility values of the same points in the respective lidar and camera coverage regions. A reliability of the plausibility label assignment is increased by this mutual validation of the information in the image data and lidar data. Moreover, this checking determines whether a depth estimation in the image data of the at least one camera is of the same scale as the scale arising from measured lidar distances.

This disclosure also relates to a system for automatically labeling sensor data of a scene. More particularly, a vehicle comprises a radar detection and at least one camera and one lidar as optical sensors. The radar detection, camera and lidar have at least a portion of the surroundings of the vehicle as respective fields of view, with the respective fields of view at least partly overlapping in a coverage region. In a succession of time steps, a set of intrinsically three-dimensional radar points is able to be provided or available as radar detection, a set of intrinsically two-dimensional image data is able to be provided by or available from the at least one camera, and a set of intrinsically three-dimensional lidar data is able to be provided by or available from the lidar at each time step t. Plausibility labels can be assigned to a respective radar point at each time step. The system is configured to correct the image data for a straight ahead view of the scene by image rectification and a subsequent perspective transformation, to calibrate a camera-based depth estimation generated by a neural network by means of the lidar data in a coverage region of the fields of view of camera and lidar, to calculate a three-dimensional point cloud representation from two-dimensional image information by means of the camera-based depth estimation, to associate the three-dimensional point cloud representation with the radar points and associate the lidar data with the radar points by way of an application of a k-closest neighbor algorithm, as a result of which, depending on the coverage region of the fields of view, a radar/lidar plausibility and a radar/camera plausibility arise taking account of Euclidean distances and uncertainties, to merge the radar/lidar plausibility and the radar/camera plausibility to form a combined optics-based plausibility, in parallel therewith, to assign a radar/tracking plausibility to each radar point by means of tracking, with odometry data of the vehicle being taken into account, to combine the optics-based plausibility and the radar/tracking plausibility and subsequently assign a binary plausibility label, the latter characterizing whether the respective radar detection describes an artifact or a plausible reflection.

In one configuration, the system is configured to use an angular velocity of a yaw angle and a translation velocity from the odometry data of the vehicle for tracking points of the radar/tracking plausibility of radar points over time and integrate this radar/tracking plausibility with the combined optics-based plausibility.

In a further configuration of the system, the radar detection is formed by plural radar sensors which are distributed around the vehicle.

In yet a further configuration, the system is configured, in respective coverage regions of lidar and camera, to check plausibility values of the same points in the respective fields of view for consistency and hence increase a reliability of the label assignment.

Further advantages and configurations of the invention arise from the description and the appended drawings.

It is understood that the features specified above and the features yet to be explained below are able to be used not only in the respectively specified combination but also in other combinations or on their own without departing from the scope of the present invention.

DETAILED DESCRIPTION

Figure 1:
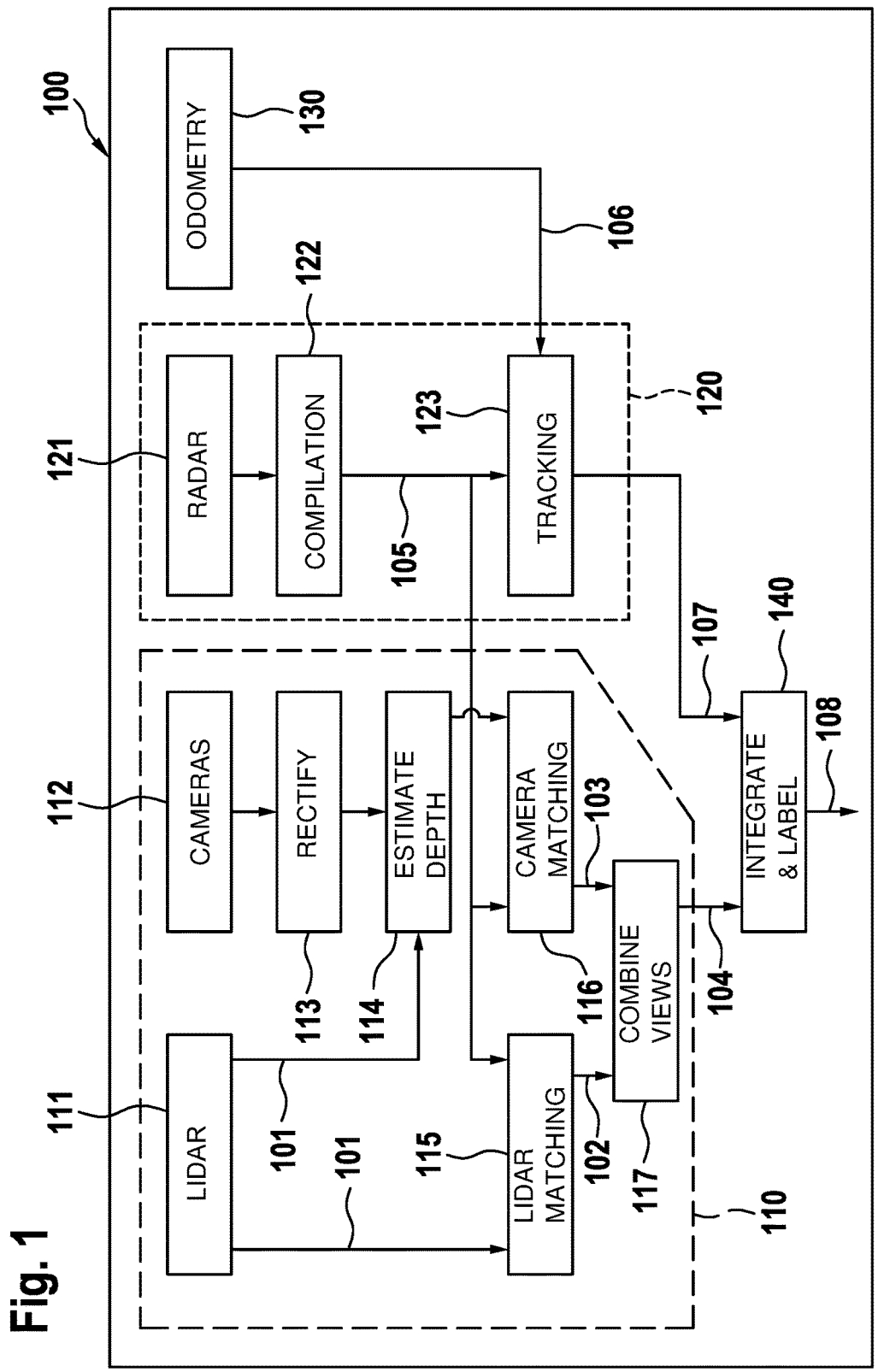
FIG. 1 schematically shows a structural architecture for an embodiment of the method according to the invention.

FIG. 1 schematically shows a structural architecture 100 for an embodiment of the method of this disclosure. At a time step t, there is an optical observation 110 by optical sensors such as by a lidar 111 and separately by cameras 112, each of which independently observes vehicle surroundings. The lidar device 111 may be one of many commercially available lidar devices that pulses laser beams of objects and determines distance by a time to receive a reflection of the emitted beams. Manufacturers of such devices include Velodyne, Ouster and Luminar Technolgies. The cameras can be one of the commercially available vehicle-mounted cameras currently used for driving and parking assist functions. Image data recorded by the cameras 112 are corrected in a rectification module 113. Depth information taken from a lidar data record $P_{lidar,t}$ 101, which originates from the lidar 111, is used for depth estimation 114 of the image data and a three-dimensional point cloud representation is calculated. By applying a k-nearest neighbor algorithm, the lidar data record $P_{lidar,t}$ 101 is associated with a radar data record $P_{radar,t}$ 105 and a radar/lidar plausibility $w_{lm}(p_{i,t})$ 102 is generated in a lidar matching module 115. By applying the k-nearest neighbor algorithm, the three-dimensional point cloud representation is associated with the radar data record $P_{radar,t}$ 105 and a radar/camera plausibility $w_{cm}(p_{i,t})$ 103 is generated in a camera matching module 116. The radar/lidar plausibility $w_{lm}(p_{i,t})$ 102 and the radar/camera plausibility $w_{cm}(p_{i,t})$ 103 are merged to form a combined optics-based plausibility $w_{opt}(p_{i,t})$ 104 in a combination module 117, with even non-overlapping regions of fields of view of the lidar 111 and of the cameras 112 being taken into account, the non-overlapping regions representing dead angles for the respective other optical sensor. Further, there is a temporal signal analysis 120 of radar sensors 121 at the time step t, having the radar points $P_{radar,t}$ 105 as a consequence following a compilation 122 of raw data of the radar sensors 121. At the same time, odometry data 106 in the form of an angular velocity of the yaw angle $\dot{\psi}$ and a translation velocity $v_t$ are available from an odometry 130 of the vehicle such as speedometers and accelerometers. Temporal tracking of a radar/tracking plausibility $w_{tr}(p_{i,t})$ 107 is implemented by a tracking module 123 with the aid of these odometry data 106. From integrating the combined optics-based plausibility $w_{opt}(p_{i,t})$ 104 and the radar/tracking plausibility $w_{tr}(p_{i,t})$ 107, a binary plausibility label $\hat{y}(p_{i,t})$ for differentiating between artifact and object is obtained as a result 108.'

Figure 2:
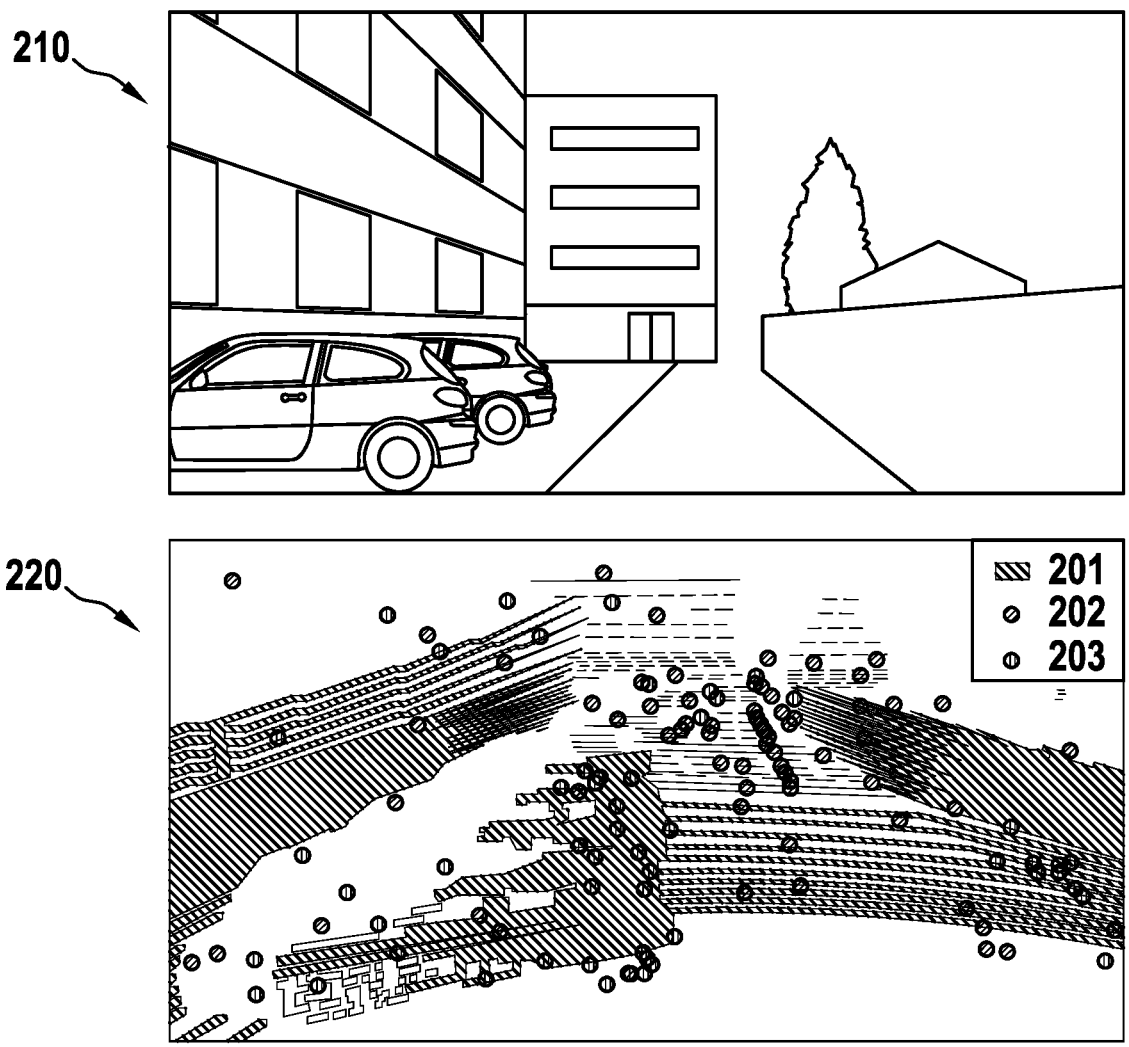
FIG. 2 shows a camera image and a visualization of plausibility labels superimposed with lidar data for a configuration of the system of the invention.

FIG. 2 shows a camera image 210 and a visualization 220 of plausibility labels 202, 203 superposed with lidar data 201 for the configuration of the system according to the invention. In both cases, the same scene is observed.

The vehicle may have an onboard computer capable of processing the data of the lidar 111, the cameras 112 and the radar sensors 121 at least one sensor such that all or some of the method steps described above can be performed by the onboard computer. The onboard computer is capable of receiving image data from the cameras 1123, depth information from the lidar 111 and radar data from the radar sensors 121, storing the received data, analyzing the data, for example, with the k-nearest neighbor algorithm or to produce the three-dimensional point cloud representation and comparing or integrating the data to produce the combined optics-based plausibility $w_{opt}(p_{i,t})$ 104 and the radar/tracking plausibility $w_{tr}(p_{i,t})$ 107, and to provide a binary plausibility label $\hat{y}(p_{i,t})$. The onboard computer is connected communicatively to the lidar 111, the cameras 112 and the radar sensors 121 and other vehicle equipment such as a speedometer and accelerometer and odometry devices, for example, via a bus system (for example CAN, CAN FDO or FlexRay®) and/or comprises subunits or subnodes.

The vehicle also may have a wireless transceiver by means of which the onboard computer is connected communicatively to a cloud system and/or a position detection system.

The vehicle also may have a transceiver, that is to say a device configured to send and to receive (preferably digital) data. The onboard computer is connected communicatively to this transceiver so that the onboard computer can receive data from outside the vehicle. Examples of external data of this kind may include time of day, weather data, traffic data and land use conditions. In one embodiment, the onboard computer does not perform the method completely independently, but rather forwards raw data or conditioned data to at least one other computer, for example in a cloud system, and receives back conditioned data or finished results.

The terms cloud system, computer, server or server units are used here synonymously with the devices known from the prior art. A computer accordingly comprises one or more general-purpose processors (CPUs) or microprocessors, RISC processors, GPUs and/or DSPs. The computer has for example additional elements such as storage interfaces of the communication interfaces. Optionally or additionally, the terms refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

A (data) memory is for example a hard disk (HDD) or a (nonvolatile) solid state memory, for example a ROM store or flash memory [flash EEPROM]. The memory often comprises a plurality of individual physical units or is distributed over a multiplicity of separate devices, as a result of which access thereto takes place via data communication, for example package data service. The latter is a decentralized solution, wherein memory and processors of a multiplicity of separate computers, for example the onboard computers of other motor vehicles, are used instead of a (single) central server or in addition to a central server.

The data transmission by means of the transceiver having at least one antenna for sending and receiving preferably takes place using the conventional mobile radio connection frequencies and formats, such as for example GSM (Global System for Mobile Communications), 3G, 4G or 5G, CDMA (Code Division Multiple Access), CDMA, UMTS (Universal Mobile Telecommunications System) or LTE (Long Term Evolution). Alternatively or additionally, the communication, for example using a handheld (for example a smartphone), is performable wirelessly via WLAN (for example according to one of the IEEE 802.11x standards), via WPAN (for example according to one of the IEEE 802.15.i standards), or else by infrared or (in wired fashion) by cable.

For the purpose of adapting and conditioning data, for example for one of the above transmission algorithms and/or for the programming language of the requesting user terminal, and conditioning them into data packets, for example as Internet Protocol datagram for the TCP/IP protocol, and/or compressing data, there is provision for a communication interface that thus conditions the data for transmission by means of the transceiver or for processing received data, preferably as machine code or machine-readable command forms of comparable program layers.

LIST OF REFERENCE SIGNS

100 Structural architecture of the method
101 $P_{lidar,t}$ (Lidar data record at the time t)
102 $w_{lm}(p_{i,t})$ (Radar/lidar plausibility)
103 $w_{cm}(p_{i,t})$ (Radar/camera plausibility)

104 $w_{opt}(p_{i,t})$ (Combined radar/lidar and radar/camera plausibility values)
105 $P_{radar,t}$ (Radar data record at the time t)
106 $\psi_t, v_t$ (Angular velocity of the yaw angle and translation velocity)
107 $w_{tr}(p_{i,t})$ (Point tracking plausibility values at the time t)
108 $\hat{y}(p_{i,t})$ (Plausibility label $\hat{y}$ for point $p_{i,t}$)
110 Optical observation
111 Lidar
112 Surround cameras
113 Image rectification and perspective transformation
114 Depth estimation
115 Lidar matching module
116 Camera matching module
117 Combination of non-overlapping fields of view
120 Temporal signal analysis
121 Radar sensors
122 Compilation
123 Tracking module
130 Odometry (distance traveled measurement/position/orientation)
140 Integration and labeling
210 Camera image
220 Visualization of plausibility labels overlaid by lidar
201 Lidar
202 Radar artifacts (plausibility label $\hat{y}=0$)
203 Plausible radar detection (plausibility label $\hat{y}=1$)

What is claimed is:

1. A method for automatically labeling sensor data of a scene, wherein a vehicle comprises a radar detector and optical sensors that include at least one camera and a lidar, the radar detector, the camera and the lidar having at least a portion of the surroundings of the vehicle as respective fields of view and the respective fields of view at least partly overlapping in a coverage region, wherein, in a succession of time steps, a set of three-dimensional radar points is provided by the radar detector, a set of two-dimensional image data is provided by the at least one camera, and a set of three-dimensional lidar data is provided by the lidar at each time step t, and wherein plausibility labels are assigned automatically to a respective radar point at each time step by virtue of:
  correcting the image data for a straight ahead view of the scene by image rectification and a subsequent perspective transformation;
  generating a camera-based depth estimation by a neural network being calibrated by means of the lidar data in a coverage region of the fields of view of camera and lidar;
  calculating a three-dimensional point cloud representation from two-dimensional image information by means of the camera-based depth estimation;
  associating the three-dimensional point cloud representation with the radar points and associating the lidar data with the radar points by way of an application of a k-closest neighbor algorithm, as a result of which, depending on the coverage region of the fields of view, a radar/lidar plausibility and a radar/camera plausibility arise while accounting for Euclidean distances and uncertainties;
  merging the radar/lidar plausibility and the radar/camera plausibility to form a combined optics-based plausibility, and,
  in parallel with forming the combined optics-based plausibility;
  assigning a radar/tracking plausibility to each radar point by means of tracking, with odometry data of the vehicle being taken into account; and
  combining the optics-based plausibility and the radar/tracking plausibility to form a binary plausibility label and assigning the binary plausibility label for characterizing whether the respective radar detection describes an artifact or a plausible reflection.

2. The method of claim 1, wherein an angular velocity of a yaw angle and a translation velocity from the odometry data of the vehicle are used for tracking points of the radar/tracking plausibility of radar points over time and this radar/tracking plausibility is integrated with the combined optics-based plausibility.

3. The method of claim 1, wherein the radar detection is formed by a plurality of radar sensors.

4. The method of claim 1, wherein, in a respective coverage region of lidar and camera, respective plausibility values of, in each case, the same points in the respective fields of view are each checked for consistency to determine a reliability of the label assignment.

5. A system for automatically labeling sensor data of a scene, wherein a vehicle comprises a radar detector and optical sensors that include at least one camera and a lidar as optical sensors, the radar detector, the camera and the lidar each having at least a portion of surroundings of the vehicle as a respective field of view and the respective fields of view at least partly overlapping in a coverage region, wherein, in a succession of time steps, a set of three-dimensional radar points is provided by the radar detector, a set of two-dimensional image data is provided by the at least one camera, and a set of three-dimensional lidar data is provided by the lidar at each time step t, and wherein a respective plausibility label is automatically assignable to a respective radar point at each time step, the system being configured
  to correct the image data for a straight ahead view of the scene by image rectification and a subsequent perspective transformation,
  to calibrate a camera-based depth estimation generated by a neural network by means of the lidar data in a coverage region of the fields of view of camera and lidar,
  to calculate a three-dimensional point cloud representation from two-dimensional image information by means of the camera-based depth estimation,
  to associate the three-dimensional point cloud representation with the radar points and associate the lidar data with the radar points by way of an application of a k-closest neighbor algorithm, as a result of which, depending on the coverage region of the fields of view, a radar/lidar plausibility and a radar/camera plausibility arise taking account of Euclidean distances and uncertainties,
  to merge the radar/lidar plausibility and the radar/camera plausibility to form a combined optics-based plausibility,
  in parallel therewith, to assign a radar/tracking plausibility to each radar point by means of tracking, with odometry data of the vehicle being taken into account,
  to combine the optics-based plausibility and the radar/tracking plausibility and subsequently assign a binary plausibility label, the latter characterizing whether the respective radar detection describes an artifact or a plausible reflection.

6. The system of claim 5, configured to use an angular velocity of a yaw angle and a translation velocity from the odometry data of the vehicle for tracking points of the radar/tracking plausibility of radar points over time and integrate this radar/tracking plausibility with the combined optics-based plausibility.

7. The system of claim 5, wherein the radar detection is formed by a plurality of radar sensors distributed around the vehicle.

8. The system of claim 5, configured, in a respective coverage region of lidar and camera, to check respective plausibility values of in each case identical points in the respective fields of view for consistency and increased reliability of the label assignment.

* * * * *